Patented Jan. 1, 1952

2,580,919

UNITED STATES PATENT OFFICE 2,580,919

ARACYLHYDRAZO SUBSTITUTED NITRILES

Edward G. Howard, Jr., Wilmington, Del., assignor to E. I. du Pont de Nemours & Company, Wilmington, Del., a corporation of Delaware No Drawing. Application February 1, 1950, Serial No. 141,866

8 Claims. (Cl. 260—465)

This invention relates to new compounds and more particularly to new hydrazine derivatives.

Organic compounds having directly linked nitrogens have found their most important use in dyestuffs or their preparation. Such compounds are the aromatic azo and diazonium compounds. Certain azo compounds in which the azo nitrogens are attached to non-aromatic, i. e., aliphatic or cycloaliphatic, carbon have found utility as polymerization catalysts as shown in U. S. 2,471,959. In general, these azo compounds and their hydrazo precursors are symmetrical.

This invention has as an object the provision of new organic nitrogen compounds. A further object is the preparation of new catalysts for polymerization. Another object is the provision of a new process for the polymerization of addition polymerizable ethenoid monomers. Other objects will appear hereinafter.

These objects are accomplished by this invention of acylhydrozonitriles wherein one of the hydrazine nitrogens is attached to an aromatic acyl radical and the other attached to carbon of a cyanoalkyl or cyanocycloalkyl radical, wherein the cyano group is on the carbon attached to hydrazine nitrogen which carbon is attached to at least one hydrocarbon radical and not more than one hydrogen atom.

These compounds are particularly useful in polymerization systems to polymerize ethylenically unsaturated compounds at low temperatures.

The compounds of this invention may be prepared by reacting a monoaracyl hydrazine by condensation with a carbonyl compound such as acetone and addition of hydrogen cyanide to the resulting condensation product.

The following examples in which parts are by weight are illustrative of the invention.

EXAMPLE I

Following the general procedure of Curtius, J. pr. chem. (2), 58, 166–173, acetone was added to a solution of benzenesulfonyl hydrazine in aqueous ethanol at 65° C. There was obtained a 93% yield of the acetone hydrazine condensation product ($C_6H_5SO_2NHN=C(CH_3)_2$) which melted at 139–149° C. To 36 parts of this compound was added 200 parts of liquid hydrogen cyanide. After standing 36 hours, the excess hydrogen cyanide was removed by evaporation at 35° C. while nitrogen was passed through the mixture. A quantitative yield of white solid was obtained which upon recrystallization from toluene melted at 116–119° C., and had the following analysis for benzenesulfonylhydrazoisobutyronitrile ($C_6H_5SO_2NHNHC(CN)(CH_3)_2$):

Analysis

Calculated for $C_{10}H_{13}N_3O_2S$: C, 50.2%; H, 5.15%; N, 17.6%, S, 13.4%.
Found: C, 50.8%; H, 5.7%; N, 17.6%; S, 13.7%.

Reaction of the above compound with dimethyl sulfate in potassium hydroxide gave a corresponding monomethylated product which was insoluble in aqueous alkali.

EXAMPLE II

Benzoyl hydrazide was prepared by refluxing a mixture of hydrazine hydrate, ethyl alcohol and ethyl benzoate according to the procedure of McFayden and Stevens, J. Chem. Soc. 1936, 584–7. To a solution of 25 parts of 95% ethyl alcohol containing 0.3 part of acetic acid was added 6.8 parts of benzoyl hydrazide and 3.6 parts of isobutyraldehyde. There was obtained upon filtration and addition of water to the filtrate a total of 9 parts (93% yield) of crystals which upon recrystallization melted at 125–128° C. and had the following analysis:

Analysis

Calculated for $C_6H_5CONHN=CH-CH(CH_3)_2$: C, 69.5%; H, 7.4%; N, 14.7%.
Found: C, 69.4%; H, 7.7%; N, 14.4%.

Addition of 45 parts of liquid hydrogen cyanide to 5.3 parts of the above hydrazone at 25° C. for two days followed by removal of excess hydrogen cyanide gave 5.5 parts of a crystalline product (corresponding to a 91% yield) which melted at 125–128° C. and had a nitrogen content of 19.7% as compared to a calculated value of 19.3% for the benzoylhydrazoisovaleronitrile $C_6H_5CONHNHCH(CN)CH(CH_3)_2$.

EXAMPLE III

Benzoyl hydrazide was reacted with acetone according to the procedure of Curtius, J. pr. chem. (2) 50, 305. The resulting benzoyl hydrazone of acetone was reacted with HCN in the general manner described in Example I to give benzoylhydrazoisobutyronitrile ($C_6H_5CONHNHC(CN)(CH_3)_2$)

in a 95% yield. The compound had a melting point of 120–123° C. and the following analysis:

Analysis

Calculated for $C_{11}H_{13}ON_3$: N, 20.7%.
Found: N, 20.6%.

EXAMPLE IV

Benzenesulfonylhydrazine (8.6 parts) was reacted with cyclohexanone (4.9 parts) in a boiling solution of 95% ethanol (16 parts) containing acetic acid (0.2 part) for 10 minutes, following which water (20 parts) was added and the hydrazone removed by filtration. There was obtained 12 parts of the hydrazone, corresponding to a 95% yield. This melted at 156–158° C. This hydrazone (15.1 parts) was treated with hydrogen cyanide (50 parts) for 24 hours at room temperature. After evaporation of the hydrogen cyanide, there was obtained 16.2 parts of the benzenesulfonylhydrazocyclohexanecarbonitrile, i. e.,

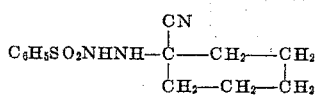

which had a melting point of 153–155° C.

The acylhydrazoalkanonitriles and acylhydrazocycloalkanonitriles of this invention are of generic utility in the polymerization of ethylenically unsaturated monomers subject to addition polymerization as is illustrated in Examples V and VI below and further illustrated in my copending applications Serial No. 148,015, filed March 6, 1950, and Serial No. 218,267, filed March 29, 1951.

EXAMPLE V

A glass vessel was charged with 13.2 parts of acrylonitrile, 40 parts of ethyl alcohol, 50 parts of water, 0.59 part of the arylacylhydrazonitrile as specified below, 5.7 parts of a 3% aqueous solution of hydrogen peroxide and 0.02 part of cupric chloride dihydrate. When the hydrazonitrile was that of Example I and the time of polymerization was one hour at 25° C., a 70% yield of polymer was obtained.

When the hydrazonitrile was that of Example II, a 65% yield of polymer was obtained.

When the hydrazonitrile was that of Example III, a 73% yield of polymer was obtained.

When the hydrazonitrile was that of Example IV, and sodium hypochlorite was used in place of hydrogen peroxide and with no cupric salt present, an 11% yield of polymer was obtained in 24 hours at 0° C.

EXAMPLE VI

A glass vessel was charged with 56 parts of absolute ethanol, 50 parts of water, 0.59 part of benzenesulfonylhydrazoisobutyronitrile, 0.57 part of periodic acid dihydrate and 15.6 parts of vinyl chloride. After 8 hours at 25° C., the vessel was opened and the polymer collected by filtration. There was obtained 9 parts of polymer corresponding to a 58% conversion.

Although the compounds of this invention are active per se as polymerization initiators for the polymerization of ethylenic compounds, oxidizing agents such as periodic acid, 1,3-dichloro-5,5-dimethylhydantoin, hypohalites, etc., increase the rate of polymerization at low temperatures. In many instances cupric ion further activates the polymerization.

The aracylhydrazonitriles of this invention include the acyl derivatives of both carboxylic and sulfonic acids (as defined by Hackh's Chemical Dictionary, 3rd ed., Blakiston, Phila., page 18). Of the aracyl radicals those having up to 11 carbons may be employed, e. g., benzoyl, naphthoyl, benzenesulfonyl, or toluenesulfonyl, and of these the benzene acyls are preferred. The hydrazonitriles may be represented by the formula

R NHNHC(CN)R'R'' wherein R is an aracyl radical as defined above and R' is hydrogen or hydrocarbon and R'' is hydrocarbon, the hydrocarbon radicals having from 1 to 6 or more carbons. Preferably the R' and R'' together are a total of 2 to 7 carbons and together may form an alicyclic ring.

In addition to those described in the examples, the following aracylhydrazonitriles further illustrate compounds of this invention:

C₆H₅CONHNHC(CN)(CH₃)(CH₂CH(CH₃)₂)

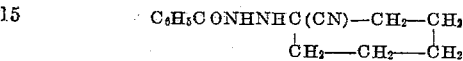

C₆H₅CONHNHC(CN)(H)(CCl₃)
C₆H₅CONHNHC(CN)(CH₃)(C₆H₅)
C₆H₅CONHNHC(CN)(CH₃)(C₆H₅)

The compounds of this invention are available from simple starting materials. Thus aracyl hydrazides are obtained by the reaction of hydrazine with a suitable aracyl derivative, e. g., benzenesulfonyl chloride, benzoic acid esters, etc. These aromatic acylhydrazides react with oxocarbonylic compounds (aldehydes and ketones). The reaction is readily carried out at 25–100° C. in an inert solvent and may be facilitated by the addition of a small quantity of a carboxylic acid as a catalyst. The acylhydrazonitrile is prepared from the carbonylic condensation product by reaction with liquid hydrogen cyanide at a temperature of generally 10–40° C. The hydrogen cyanide should contain less than 50% water and preferably less than 10% water. The hydrogen cyanide is usually employed in excess, generally at least 1.5 times the theory and preferably 2–50 times the theoretical.

In addition to the use of the acylhydrazonitriles of this invention in the polymerization of ethylenically unsaturated polymerized compounds, they may be used as dye intermediates, in pesticidal formulations and for similar uses.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A process for the preparation of alpha-aracylhydrazo substituted nitriles having not more than one hydrogen on the carbon bearing the cyano and aracylhydrazo groups which comprises bringing the aracylhydrazone of an oxocarbonylic compound in contact at 10 to 40° C. with hydrogen cyanide in the presence of not more than its weight of water.

2. Process for the preparation of aracylhydrazo substituted nitriles having not more than one hydrogen on the carbon bearing the cyano and aracylhydrazo groups which comprises bringing an aracylhydrazone of a ketone in contact at 10 to 40° C. with hydrogen cyanide in the presence of not more than its weight of water.

3. An aracylhydrazo substituted nitrile having the aracylhydrazo and cyano groups on the same carbon which carbon bears not more than one hydrogen.

4. An aracylhydrazo alkanonitrile having the aracylhydrazo and cyano groups on the same carbon which carbon bears not more than one hydrogen.

5. A hydrazine compound having one hydrazine hydrogen replaced by an aracyl group and a hydrogen on the other nitrogen replaced by a monovalent cyanohydrocarbon radical having the cyano group on the carbon bonded to hydrazine nitrogen and having not more than one hydrogen on said carbon.

6. An arylsulfonylhydrazo substituted nitrile having the arylsulfonylhydrazo and cyano groups on the same carbon which carbon bears not more than one hydrogen.

7. An arylsulfonylhydrazo alkanonitrile having the arylsulfonylhydrazo and cyano groups on the same carbon which carbon bears not more than one hydrogen.

8. A hydrazine compound having one hydrazine hydrogen replaced by an arylsulfonyl group and a hydrogen on the other nitrogen replaced by a monovalent cyanohydrocarbon radical having the cyano group on the carbon bonded to hydrazine nitrogen and having not more than one hydrogen on said carbon.

EDWARD G. HOWARD, Jr.

REFERENCES CITED

The following references are of record in the file of this patent:

UNITED STATES PATENTS

| Number | Name | Date |
|---|---|---|
| 1,992,615 | Hoffman et al. | Feb. 20, 1935 |
| 2,469,358 | Alderson et al. | May 10, 1949 |
| 2,471,959 | Hunt | May 31, 1949 |

OTHER REFERENCES

Thiele et al., Liebig's Ann., vol. 283, pp. 33–37 (1894).